United States Patent [19]

Pasqualucci

[11] 4,378,867
[45] Apr. 5, 1983

[54] CLUTCH DRUM RETAINER

[76] Inventor: Luciano Pasqualucci, 6183 Shady Side Rd., Shady Side, Md. 20867

[21] Appl. No.: 193,075

[22] Filed: Oct. 2, 1980

[51] Int. Cl.³ .................... F16D 13/56; F16D 13/69
[52] U.S. Cl. .................. 192/70.13; 192/70.19; 192/70.27; 192/70.28; 192/98
[58] Field of Search ............... 192/70.11, 70.13, 70.19, 192/70.2, 70.27, 70.28, 110 R, 110 S, 98, 112

[56] References Cited

U.S. PATENT DOCUMENTS

| 1,164,531 | 12/1915 | Kwis | 192/112 X |
| 1,209,351 | 12/1916 | Stickney | 192/70.19 X |
| 2,039,590 | 5/1936 | Freeborn | 192/70.11 |
| 3,175,664 | 3/1965 | Ramsel | 192/70.28 |
| 3,228,501 | 1/1966 | Eason et al. | 192/70.28 X |
| 3,240,305 | 3/1966 | Hirano | 192/70.28 X |
| 3,537,556 | 11/1970 | Pfeffer et al. | 192/70.28 |
| 3,695,407 | 10/1972 | Peery | 192/70.28 X |

FOREIGN PATENT DOCUMENTS

| 182319 | 6/1955 | Austria | 192/70.19 |
| 1028252 | 5/1953 | France | 192/70.28 |

Primary Examiner—Rodney H. Bonck
Attorney, Agent, or Firm—Shlesinger, Arkwright, Garvey & Dinsmore

[57] ABSTRACT

An antigrab clutch assembly for motorcycles and the like comprising drive shaft means, clutch hub means associated with the drive shaft means, throw out assembly means associated with the clutch hub means, a clutch housing, friction clutch disc means, engageable clutch disc means, the friction clutch means mounted on clutch hub means, the engageable clutch disc means mounted on the clutch housing and cooperating with the friction clutch means, means for securing the clutch housing to the drive shaft means, whereby grab is prevented by maintaining the clutch housing from moving with the disc means axially of the drive shaft means when the clutch hub means is moved.

12 Claims, 10 Drawing Figures

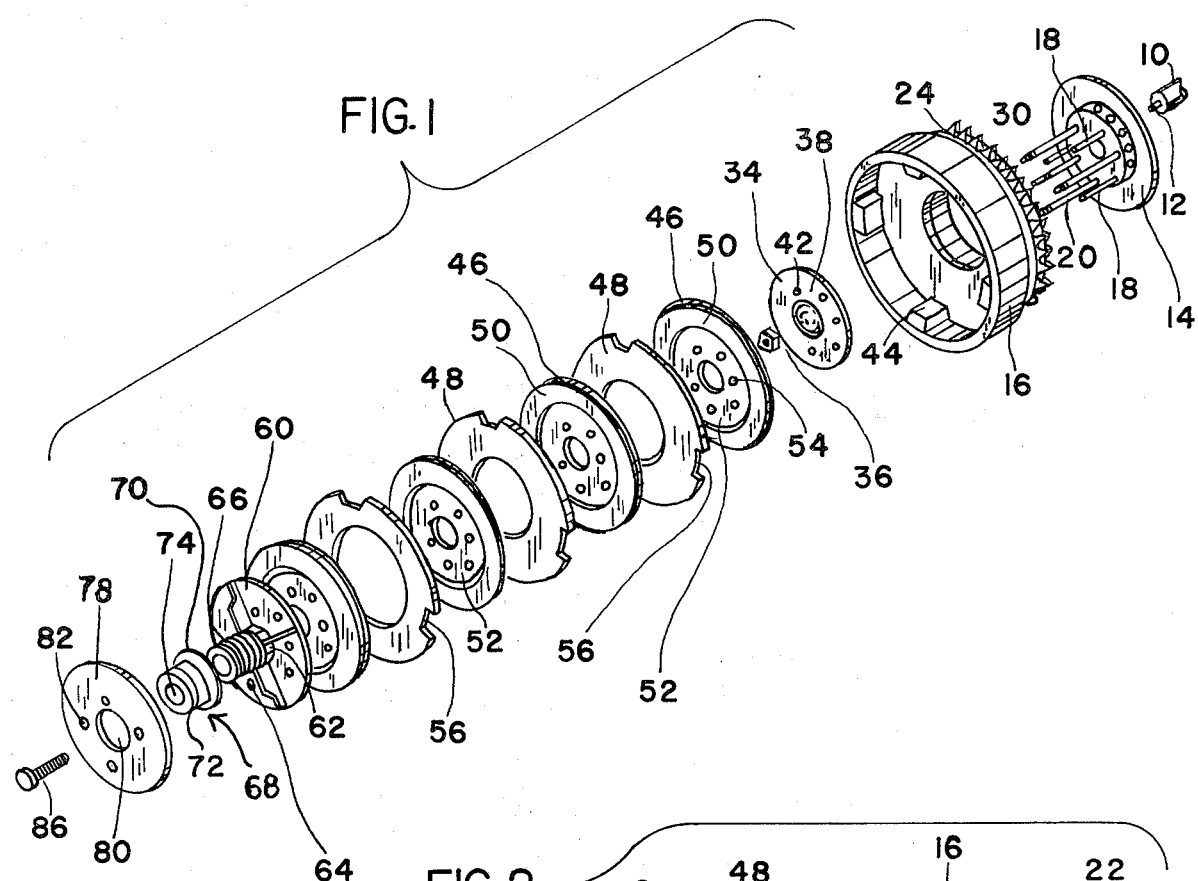
FIG. 1
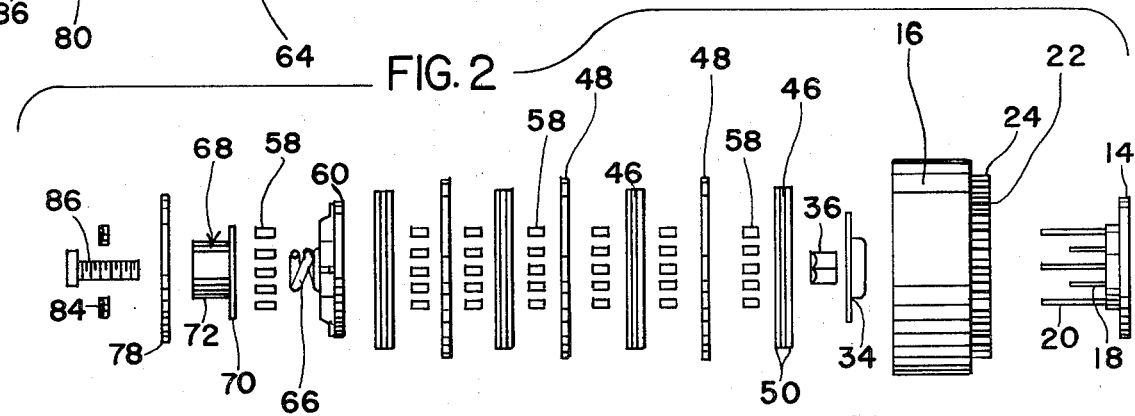
FIG. 2
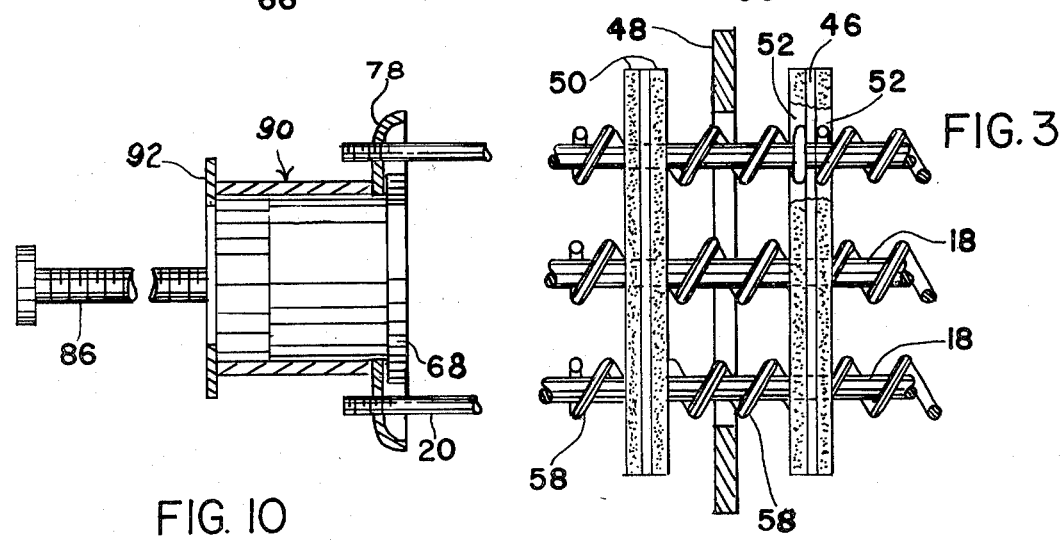
FIG. 10
FIG. 3

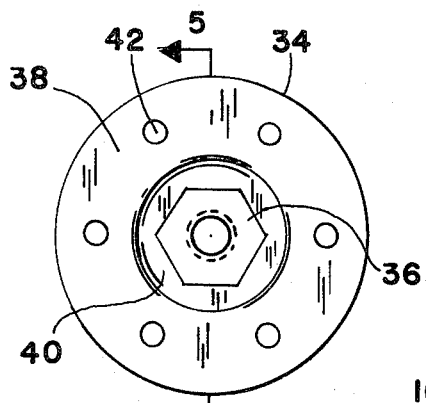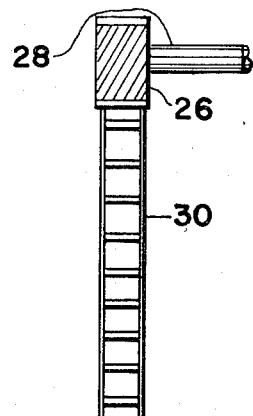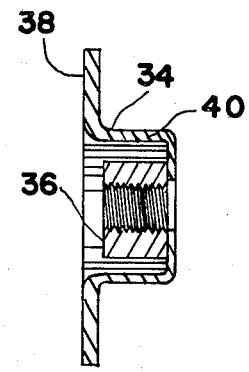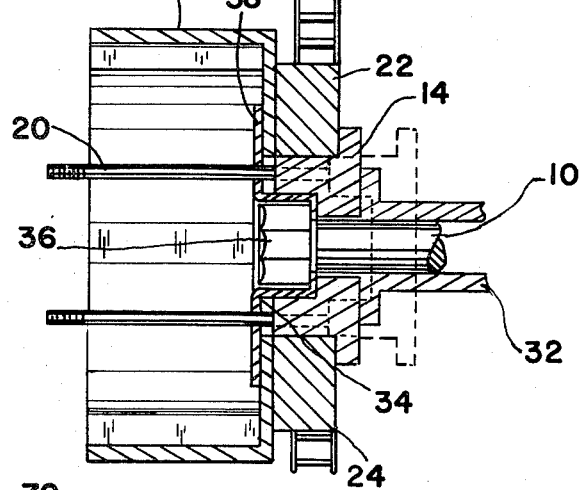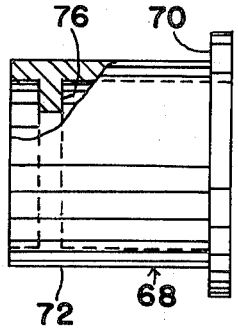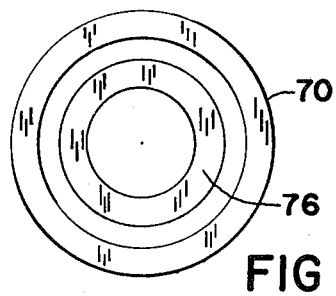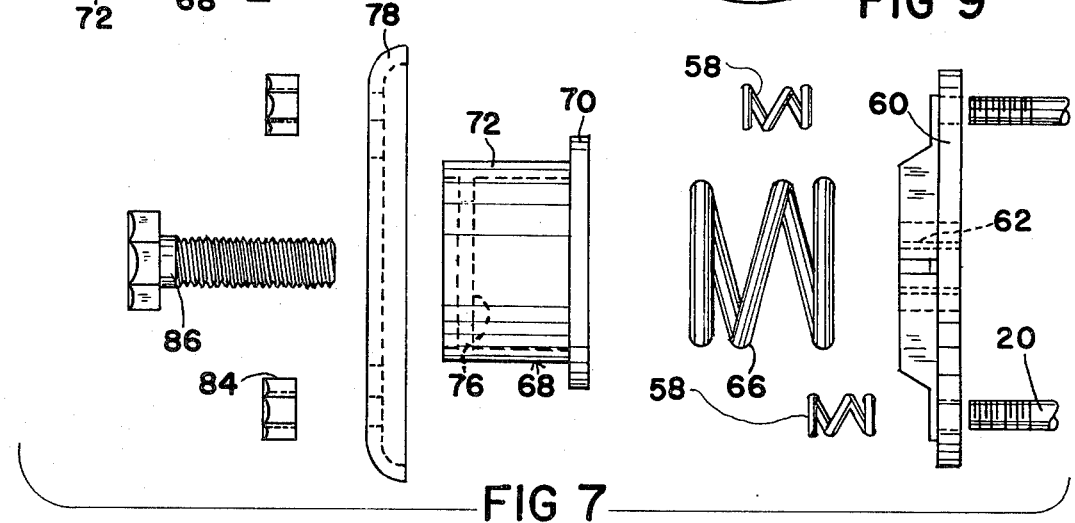

CLUTCH DRUM RETAINER

This invention relates to clutches and more specifically to belt drive clutches for vehicles such as motorcycles and is designed to prevent jerking or grabbing during the clutch operation.

BACKGROUND OF THE INVENTION

Certain present day clutch assemblies suffer from short comings arising from cocking of the friction discs as the clutch assembly is in the process of being engaged and disengaged. Since the friction discs are mounted on a series of pins extending from the clutch hub, a balance of pressure upon the friction discs must be maintained in order to prevent the tilting of one or more or the friction discs and subsequent locking of the discs upon the pins as the discs are moved relative to the pins. For this reason the operator of the vehicle experiences difficulty when attempting to operate the clutch mechanism. Excessive pressure must be applied to the clutch lever which proves to be an inconvenience for most operators.

Another problem associated with certain present day clutch assemblies arises from a jerking of the vehicle when the clutch is disengaged. This occurrence is due to a shifting of the clutch drum which causes the friction discs to engage.

OBJECTS AND SUMMARY OF THE INVENTION

It is an object of this invention to provide means for clutch assembly which prevents jerking or grabbing of the clutch during shifting operations.

Another object of this invention is to provide anti-grabbing means for clutch assemblies which can be readily applied to standard equipment.

A further object of this invention is to provide an antigrabbing means for clutch assemblies which is inexpensive to manufacture.

Yet another object of this invention is to provide antigrabbing means for clutch assemblies which can be marketed in kit form.

Still a further object of this invention is to provide antigrabbing means for clutch assemblies which has minimum wear and which requires little maintenance.

Another object of this invention is to provide antigrabbing means for clutch assemblies which can be readily removed when the clutch requires repair.

Still another object of this invention is to provide an anticlutch assembly for motorcycles of the belt drive type which reduces the grip pressure of the cyclist thus reducing fatigue over periods require frequent shifting.

Still another object of this invention is to provide an anticlutch assembly for motorcycles which reduces noise in operation.

A further object of this invention is to provide an antigrabbing means for a clutch assembly which reduces wear on the clutch plates and discs thereby increasing the wear life.

The present invention provides a new apparatus for alleviating the problems associated with the prior art. Novel spring means are provided for maintaining the friction discs perpendicular to the pins on which they are mounted. By inclusion of the spring member centrally located on a pressure plate for maintaining the friction discs in assembled relation, cocking of the friction discs is eliminated.

Means are provided for securing the clutch housing to the clutch housing support means. By the inclusion of a retaining plate positioned on the clutch housing and fastened to the clutch housing support means, the clutch housing is held stationary while the clutch drum is free to move.

DESCRIPTION OF THE DRAWINGS

FIG. 1 is exploded perspective view of the improved clutch assembly.

FIG. 2 is an exploded side elevation view of FIG. 1.

FIG. 3 is a fragmentary side elevational view with portions broken away showing the springs in clutch disengaging elevation position.

FIG. 4 is a front elevation view of the clutch drum retaining member.

FIG. 5 is a cross sectional view taken along the line 5—5 of FIG. 4 and viewed in the direction of the arrows.

FIG. 6 is a fragmentary cross sectional view of the clutch assembly shown in disengaged (solid lines) and engaged (dotted lines) positions without the clutch discs in position on the pins.

FIG. 7 is an exploded side elevational view of the clutch disc retaining members.

FIG. 8 is an enlarged side elevational view of the spring retaining collar of FIG. 7 partially broken away.

FIG. 9 is a rear elevational view of FIG. 8.

FIG. 10 is a fragmentary side elevational in cross section with parts broken to shown indeterminent length.

DESCRIPTION

Referring to FIGS. 1 and 2 the clutch assembly is mounted on shaft 10 having threaded end portion 12, which passes through the central openings in clutch hub 14 and clutch housing 16. Extending from clutch hub 14 are a series of six pins 18 and four studs 20, the studs having threaded end portions. Welded to the back portion of clutch housing 16 is a sprocket 22 having teeth 24. As illustrated in FIG. 6, a drive gear 26 mounted on drive shaft 28 is connected to sprocket 22 by means of a drive chain 30. Clutch hub 14 is allowed to move axially to shaft 10 by throw out member 32. Frictional contact between clutch hub 14 and sprocket 22 is reduced by means of a bearing member. The clutch hub retaining plate 34 and nut 36 are provided for securing the clutch housing 16 to the shaft 10.

Referring to FIGS. 4 and 5, clutch hub retaining plate 34 is provided with a flange 38 and a projection 40. The holes 42 which cooperate with pins 18 and studs 20 are provided in flange 38. As best shown in FIG. 6, clutch hub retaining plate 34 is positioned in clutch housing 16 so that when nut 36 is fastened onto threaded end portion 12 of shaft 10, projection 40 of clutch hub retaining plate 34 is situated within the central opening of clutch housing 16. In this secured position, movement axially from shaft 10 is prevented due to the proximity of clutch housing 16 with respect to flange 38. The inner wall member of clutch housing 16 is provided with a series of projecting keys 44. Friction engaging discs 46 and engageable steel discs 48 are positioned within clutch housing 16. Each friction engaging disc 46 is provided with a flange 50 and recession 52. Holes 54 cooperating with pins 18 and studs 20 are provided in recession 52. Engageable steel discs 48 are provided with peripheral notches 56 cooperating with keys 44.

As best shown in FIG. 3 springs 58 are mounted on pins 18 and studs 20, and are positioned within recess 52 of adjacent friction engaging discs 46, so that in full compression interference between friction engaging discs 46 is avoided. The pressure plate 60 is provided for retaining friction engaging discs 46 and engageable steele discs 48 in assembled position. A nut 62 is integrally formed at the center of pressure plate 60. A series of holes 64 associated with pins 18 and studs 20 is provided in pressure plate 60. A central spring 66 is mounted over nut 62 and is held in position by a bearing collar 68. Bearing collar 68 has a flange 70 and a projection 72 which includes a central opening 74.

As best shown in FIG. 8, a bearing shoulder 76 is provided within bearing collar 68. Bearing collar 68 is held in place by a spring collar 78 (which may be flat as in FIG. 2 or curved as in FIG. 7) having a central opening 80 and four holes 82 cooperating with studs 20. Spring collar 78 fits over projection 72 and is mounted on flange 70. Spring collar 78 is secured to studs 20 by means of nuts 84. Adjustment screw 86 passes through central spring 66 and is secured to nut 62.

FIG. 10 shows a release collar 90 having a push flange 92 provided to fit over collar 68. To remove nuts 84 pressure is maintained on collar 78 by pushing on flange 92 of release collar 90. This maintains the springs in position to prevent them from flying in different directions and permit gradual release of pressure on all springs simultaneously.

OPERATION

In operation the clutch assembly works as follows. Drive shaft 28 which is powered by the vehicle's motor, turns drive gear 26 which in turn turns sprocket 22 by way of drive chain 30. Since sprocket 22 is welded to clutch housing 16, clutch housing 16 is rotated with sprocket 22. Shaft 10 on which clutch housing 16 is mounted, is surrounded by a throw out member 32 which operates the movement of clutch hub 14. Throw out member 32 is free to revolve around and move axially with respect to shaft 10. Pins 18 and studs 20 which extend from clutch hub 14, pass through the central opening of clutch housing 16. The clutch hub retaining plate 34 is mounted on pins 18 and studs 20 and is secured to the threaded end portion 12 of shaft 10 by way of nut 36. In this secured position, projection 40 of clutch hub retaining plate 34 is situated within the central opening of clutch housing 16 while flange 38 of clutch hub retaining plate is positioned in close proximity to the inner base member of clutch housing 16. Thus arranged, clutch housing 16 is prevented from moving axially of shaft 10. Positioned in alternating sequence within clutch housing 16 are friction engaging discs 46 which are mounted on pins 18 and studs 20 and engageable steel discs 48 which are locked to keys 44. Springs 58 which are mounted on pins 18 and studs 20 between adjacent friction engaging discs 46 are provided for spacing the alternating discs from each other when the clutch is disengaged. The elements shown in FIGS. 7 through 10 provide the means for securing the discs within clutch housing 16 in assembled position.

When the clutch is disengaged, clutch hub 14 is positioned as shown in solid lines in FIG. 6. Springs 58 are in extended position and allow spacing between the alternating discs. In this position only clutch housing 16 and engageable steel discs 48 revolve. When clutch hub 14 is positioned as shown by the dotted lines of FIG. 6, the alternating discs are forced together. In this position springs 58 are fully compressed so that friction engaging discs 46 bear against revolving engageable steel disc 48 and are themselves forced to revolve. Since friction engaging discs 46 are mounted on pins 18 and studs 20 of the clutch hub 14, clutch hub 14 is forced to revolve as is throw out member 32. Means for driving the vehicle wheels are associated with throw out member 32. These means are not shown in the diagrams.

While this invention has been described as having a preferred design, it will be understood that it is capable of further modification. This application, is therefore, intended to cover any variations, uses, or adaptations of the invention following the general principles thereof and including such departures from the present disclosure as come within known or customary practice in the art to which this invention pertains, and as may be applied to the essential features hereinbefore set forth and fall within the scope of this invention or limits of the claims.

What is claimed is:

1. An antigrab clutch assembly for motorcycles and the like comprising:
   (a) drive means including a sprocket and chain,
   (b) a clutch housing secured to said sprocket and rotatable therewith,
   (c) clutch hub means movable mounted in said sprocket,
   (d) throwout assembly means secured to said clutch hub means,
   (e) friction clutch disc means mounted on said hub means,
   (f) engageable clutch disc means mounted on said clutch housing and cooperating with said friction clutch disc means,
   (g) support shaft means mounted in said throwout assembly means,
   (h) said throwout assembly means rotatable on said support shaft means, and
   (i) means engageable with said clutch housing and mounted on said support shaft means for preventing axial movement of said clutch housing.

2. An antigrab clutch assembly as in claim 1 and wherein:
   (a) said means engageable with said clutch housing includes a retaining cup, and
   (b) means for securing said cup to said support shaft means.

3. An antigrab clutch assembly as in claim 2 and wherein:
   (a) said retaining cup includes a flange engageable with said clutch housing
   (b) said flange including openings for receiving said clutch hub means.

4. An antigrab clutch assembly as in claim 3 and wherein:
   (a) said clutch housing includes a central opening
   (b) said retaining cup including a central cup member cooperating with and positioned in said central opening.

5. an antigrab clutch assembly as in claim 4 and wherein:
   (a) said central cup member supports said means for securing said cup to said support shaft means.

6. An antigrab clutch assembly as in claim 5 and wherein:
   (a) said means for securing said cup to said support shaft means includes a nut, and (b) said support shaft means includes a threaded stud, and (c) said nut includes threads cooperating with said threaded stud and said nut is mounted on said threaded stud.

7. An antigrab clutch assembly as in claim 1 and wherein:

(a) said friction clutch disc means and said engageable clutch disc means includes a series of interdigital clutch disc members (b) said clutch hub means including a plurality of pins projecting through said friction clutch disc means, and (c) spring means on said pins for separating adjacent friction clutch disc means from each other.

8. An antigrab clutch assembly as in claim 7 and wherein:

(a) said spring means includes at least one coil spring for each pin.

9. An antigrab clutch assembly as in claim 8 and wherein:

(a) said friction clutch disc means including recessed areas (b) said coil springs each are of a size to fit when compressed into the recessed area of said friction clutch disc means so as to prevent interference with said clutch disc members when said clutch is engaged.

10. An antigrab clutch assembly as in claim 9 and wherein:

(a) said plurality of pins includes a plurality of studs (b) a pressure plate mounted on said studs and maintaining said disc members in assembled relation (c) a spring disc collar mounted on said studs and adjacent to said pressure plate (d) spring means on said studs between said pressure plate and said disc collar (e) said pressure plate including a central nut member (f) an adjustment screw engaging said central nut, and (g) a bearing sleeve engaging said spring disc collar, (h) a spring mounted on said adjustment screw and engaging said nut and said bearing sleeve for maintaining said clutch disc members in said clutch housing.

11. An antigrab clutch assembly as in claim 10 and including:

(a) a holddown means for said studs (b) means for permitting removal of said adjustment screw (c) said means for permitting removal of said adjustment screw including a release collar for pressing said spring disc collar down against said springs when said holddown means for said studs are removed.

12. An antigrab clutch assembly as in claim 11 and wherein:

(a) said release collar is adapted to receive said bearing sleeve.

* * * * *